United States Patent [19]

Ishihara et al.

[11] Patent Number: 5,533,850
[45] Date of Patent: Jul. 9, 1996

[54] WELDING NUT

[75] Inventors: Tsuyoshi Ishihara, Yashio; Hideyori Sakuragi; Kazuo Imanishi, both of Atsugi; Haruhiko Ishikawa, Yokohama, all of Japan

[73] Assignees: Nissan Motor Co., Ltd., Yokohama; Sannohashi Corporation, Tokyo; Yorozu Corporation, Yokohama, all of Japan

[21] Appl. No.: 345,414

[22] Filed: Nov. 21, 1994

[30] Foreign Application Priority Data

Dec. 21, 1993 [JP] Japan ............................ 5-073079 U
Jan. 28, 1994 [JP] Japan ............................ 6-026302

[51] Int. Cl.$^6$ ............................ F16B 37/00; F16B 37/06
[52] U.S. Cl. ............................ 411/171; 411/427
[58] Field of Search ............................ 411/185, 186, 411/187, 171, 427, 257, 258

[56] References Cited

U.S. PATENT DOCUMENTS

| 2,385,991 | 10/1945 | Huntoon | 411/171 |
| 2,612,647 | 10/1952 | Howe | 411/171 X |
| 3,045,736 | 7/1962 | Howe | 411/171 |
| 3,219,790 | 11/1965 | Johnson | 411/171 X |
| 3,255,798 | 6/1966 | Anderson et al. | 411/171 |
| 4,498,825 | 2/1985 | Pamper et al. | 411/186 X |

FOREIGN PATENT DOCUMENTS

678141  8/1952  United Kingdom .................. 411/171

*Primary Examiner*—Neill R. Wilson
*Attorney, Agent, or Firm*—Nikaido, Marmelstein, Murray & Oram

[57] ABSTRACT

A welding nut comprising a main cylindrical body having a bearing surface end and an axial screw hole, a flange set around an outer perimeter of the body at the bearing surface end, and axially extending protrusions formed by partially pressed the flange in a direction towards the bearing surface. The protrusions extend axially beyond the bearing surface for resistance welding. At least one groove can be formed in the bearing surface between the screw hole and the protrusions. A guide tube having an external diameter smaller than an external diameter of the body can extend axially from the bearing surface. Screw threads can be bored continuously through the screw hole of the cylindrical body and an inner perimeter of the guide tube. A large number of serrated protrusions can be formed on an outer perimeter of the cylindrical body. Each of the protrusions can have an inner surface slanting radially outwardly and axially away from the bearing surface towards an outer edge of the flange. The protrusions can have equal width and can be formed along an outer edge of the flange on a side thereof adjacent the bearing surface. At least one groove can be formed on a lower end of each of the protrusions.

8 Claims, 7 Drawing Sheets

WELDING NUT

BACKGROUND OF THE INVENTION

This invention relates to a nut to be welded on a steel plate or other weldment component.

Figure 13:
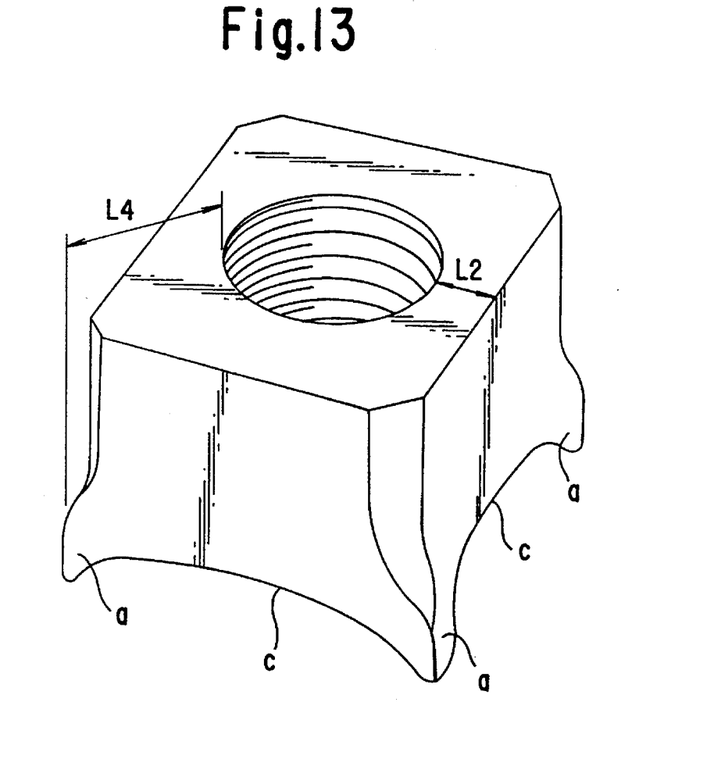
FIG. 13 is a perspective view of a conventional welding nut.
Figure 14:
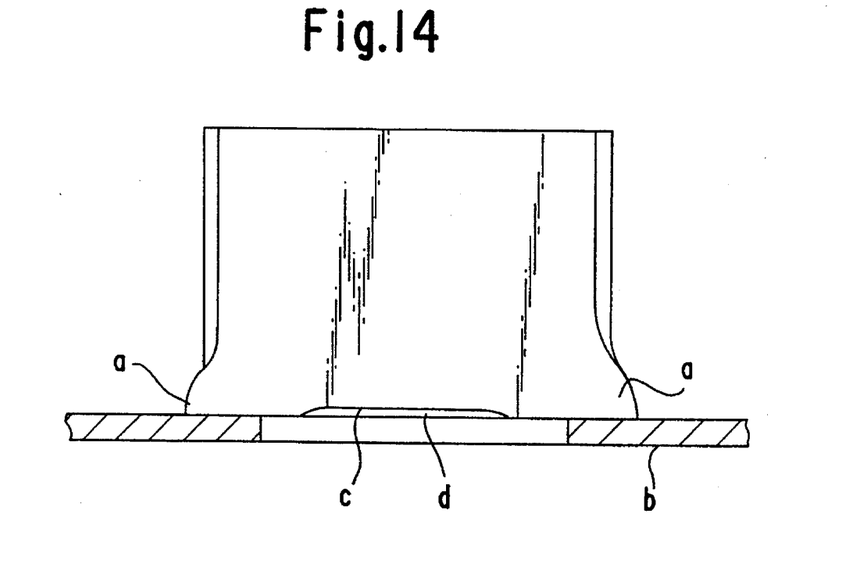
FIG. 14 is an explanatory diagram of the conventional welding nut after welding to the other weldment component, in this view, a plate.

In a conventional welding nut as shown in FIG. 13, the angular segment of a square or hexagonal nut is pressed towards its bearing surface side to form axially extending protrusions a. As shown in FIG. 14, to weld this nut to the other weldment component, the protrusions a are abutted against the steel plate b or other weldment component, wherein upon application of a voltage, the protrusions a are melted and the nut is welded to the other component.

The conventional technology has the following problems. With an angular nut as described, the protrusions a are formed by pressing the material of the angular segments over a distance virtually equal to the height of the nut. Accordingly, the material often shifts as it is being pressed. Additionally, given the strong pressing force that is required, as shown in FIG. 13, each outer edge c of the bearing surface will be distorted as the respective ends are pulled. Then, as shown in FIG. 14, upon welding the nut to the steel plate b, a gap d is formed between the outer edge c of the bearing surface and the steel plate b, reducing the strength of the weld.

Usually, in welding a nut, the flat bearing surface of the nut is cladded to the flat top surface of the steel plate, wherein the screwing axis of the nut will be plumb to the surface of the steel plate. However, in the nut as described above, since the outer edge c could be distorted, the two flat surfaces will not be cladded, and the screwing axis may not be welded precisely at right angles to the steel plate, but at a tilt. In this case, the bolt may not screw in securely, or may even be impossible to screw.

In using such an angular nut for welding, its alignment direction upon mounting must be considered, but it is difficult to stipulate a mounting direction for each part when mass produced. Accordingly, the bearing surface of the steel plate or other weldment component must be large enough to enable any resultant alignment of the nut, and thus, the component must be made larger.

OBJECTS AND SUMMARY OF THE INVENTION

An object of the present invention is to provide a welding nut which would resolve the problems of the conventional angular nut by ensuring a tight weld between the nut and the weldment component, and at the same time, eliminating the need to stipulate the mounting direction of the nut, and enable the part on which the nut will be mounted to be made smaller.

The present invention is a welding nut comprising a main cylindrical body having a bearing surface end and an axial screw hole, a flange set around an outer perimeter of the body at the bearing surface end, and axially extending protrusions formed by partially pressed the flange in a direction towards the bearing surface. The protrusions extend axially beyond the bearing surface for resistance welding. At least one groove can be formed in the bearing surface between the screw hole and the protrusions. A guide tube having an external diameter smaller than an external diameter of the body can extend axially from the bearing surface. Screw threads can be bored continuously through the screw hole of the cylindrical body and an inner perimeter of the guide tube. A large number of serrated protrusions can be formed on an outer perimeter of the cylindrical body. Each of the axially extending protrusions can have an inner surface slanting radially outwardly and axially away from the bearing surface towards an outer edge of the flange. The protrusions can have equal width and can be formed along an outer edge of the flange on a side thereof adjacent the bearing surface. At least one groove can be formed on a lower end of each of the protrusions.

The present invention is effective as follows. The protrusions of the nut can be fabricated without any distortion to the peripheral edges of the bearing surface, which will enable a tight weld to be made without any gaps between the bearing surface and the other weldment component, thus increasing the strength of the weld.

Except for the protrusions, the bearing surface of the nut is flat. Hence upon welding, the flat bearing surface of the nut is cladded to the flat surface of the steel plate, which ensures that the screwing axis of the nut will be plumb to the surface of the steel plate. The bolt, therefore, can be screwed in securely.

The round exterior shape of the nut eliminates any restrictions on its alignment, making it easier for welding, and enables the part on which the nut is mounted to be smaller, thus making a cheaper and lighter structural unit.

A nut of the present invention in which the thickness of the wall is the same as the thinnest wall of a conventional angular nut, still has the same nut strength. Accordingly, since the angular portions of an angular nut are not required, material costs are reduced significantly.

Moreover, by molding the protrusions on the flange, the screw threads of the nut and the protrusion can be separated by a fair distance without reducing the effectiveness of either segment. The round nut of this invention will use up to 25% less material than the conventional square nut, and the overall cost reduction is of significant importance for a mass produced item such as a nut.

By setting the protrusions on the flange, and by tapering the protrusions, the protrusions can be separated from the screw threads, and the protrusion material can flow to the outside as it melts upon welding. This will reduce the amount of heat being transferred to the screw threads, thus preventing any thermal distortion of the screw threads and maintaining the precision of the screw threads, the effect of which is to improve the quality of the nut. As well, the addition of a flange increases the structural strength of the nut.

The surface area of the nut is increased by molding serrated protrusions around the exterior wall of the cylindrical body of the nut, which improves the radiation of heat from the nut during welding, again reducing the amount of heat being transferred to the screw threads. The serrations also serve as a stopper when processing the screw portion of the nut.

A groove is provided in the bearing surface between the screw hole and the protrusions, which will collect any material flowing towards the screw hole during welding. This prevents any damage or distortion of the screw hole, and any accompanying loss in the tightening force of the screw.

The exterior surface of the guide tube blocks any material from scattering during welding, again preventing any damage or distortion of the screw hole, and any accompanying loss in the tightening force of the screw. The guide tube can be inserted into the mounting cavity of the other weldment component, which facilitates accurate positioning of the nut, and increases the precision of the welding.

Protrusions of equal width are set along the outer edge of the bearing surface side of the flange. This design enables the protrusions to be separated as far as possible from the screw hole, again reducing the amount of heat transferred to the screw threads.

At least one groove can be formed on the lower end of each protrusion, which reduces the contact area between the protrusion and the other weldment component, which enables the initial melting of the protrusion to proceed more rapidly, thereby reducing the amount of heat formed. This again reduces the amount of heat transferred to the screw threads, and improves production efficiency. dr

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF PREFERRED EMBODIMENTS

Figure 1:
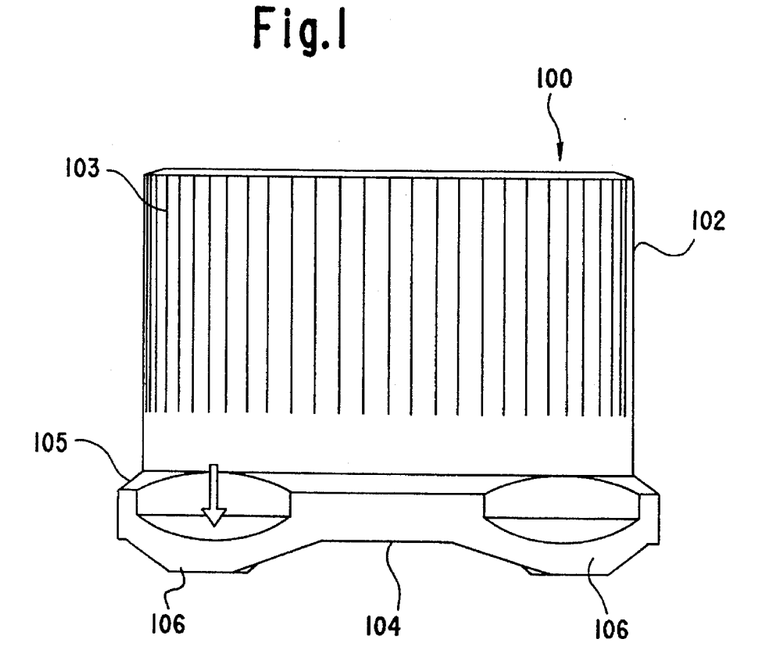
FIG. 1 is a side view of a first embodiment of the welding nut of the present invention.
Figure 2:
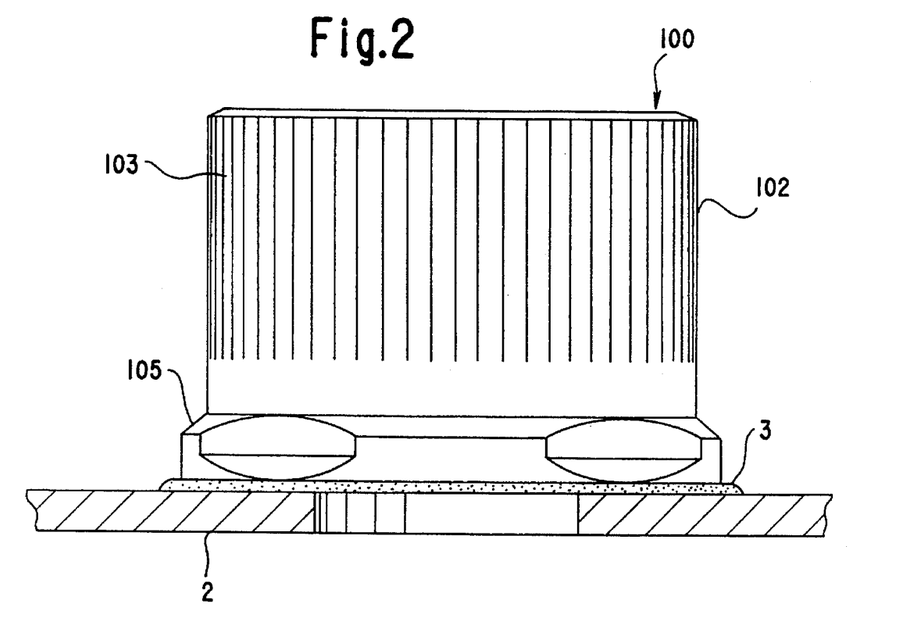
FIG. 2 is an explanatory view of the first embodiment after being welded to an other weldment component, in this view, a plate.

As shown in FIGS. 1–6, the first embodiment of the welding nut 100 of the present invention has a cylindrical body 102 with a screw hole 101 bored in the center. In FIG. 1 and FIG. 2, multiple, vertical serrations 103 are set around the outer surface of the cylindrical body 102. Such serrations 103 are optional. If used, the greater surface area of the serrated outer surface provides better heat radiation during welding, and also functions as a stopper when inserting the screw.

A ring-shaped, protruding flange 105 is set around the edge of the outer surface on the end of the cylindrical body 102 having the bearing surface 104. The diameter and thickness of the flange 105 need only be of sufficient dimensions to enable the protrusions, described later, to be formed. For example, the flange 105 can be about the size of a normal washer. The flange 105 is partially pressed toward the bearing surface 104 to form axially extending protrusions 106 for resistance welding.

In this invention, protrusions 106 are formed simply by pressing the thin flange 105, and need not be pressed over a distance virtually equal to the height of the nut, as is the case with the conventional angular fastener. Therefore, a large pressing force is not required. This prevents the outer edge of the bearing surface 104 from being distorted.

The number of protrusions 106 and degree of protrusion is pre-established such that the nut 100 and the other weldment component will be tightly bonded when the protrusion 106 is melted.

Figure 3:
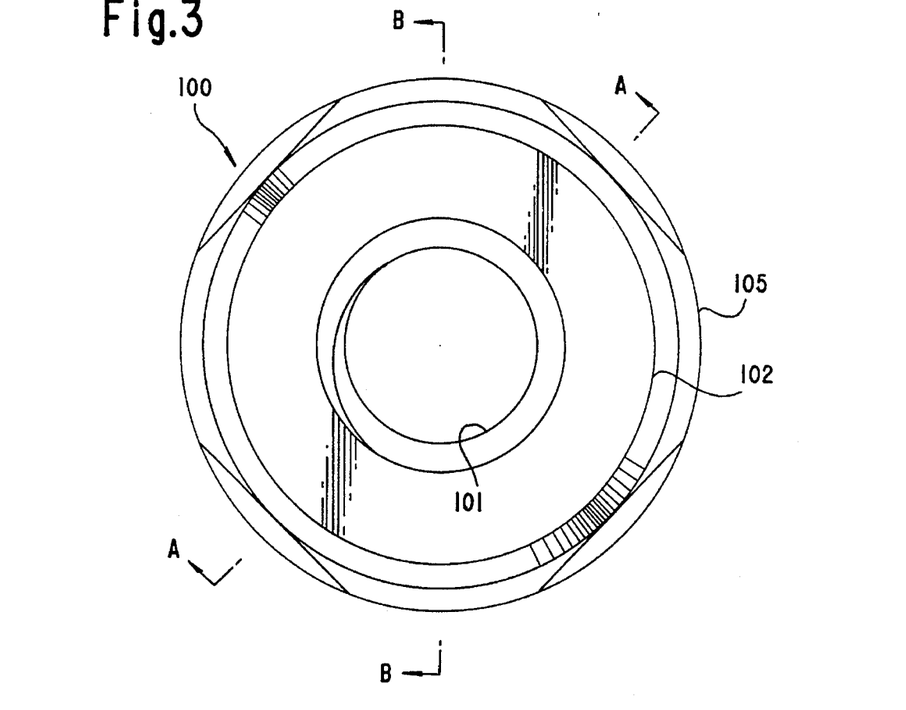
FIG. 3 is a top plan view of the first embodiment of the welding nut of this invention.
Figure 4:
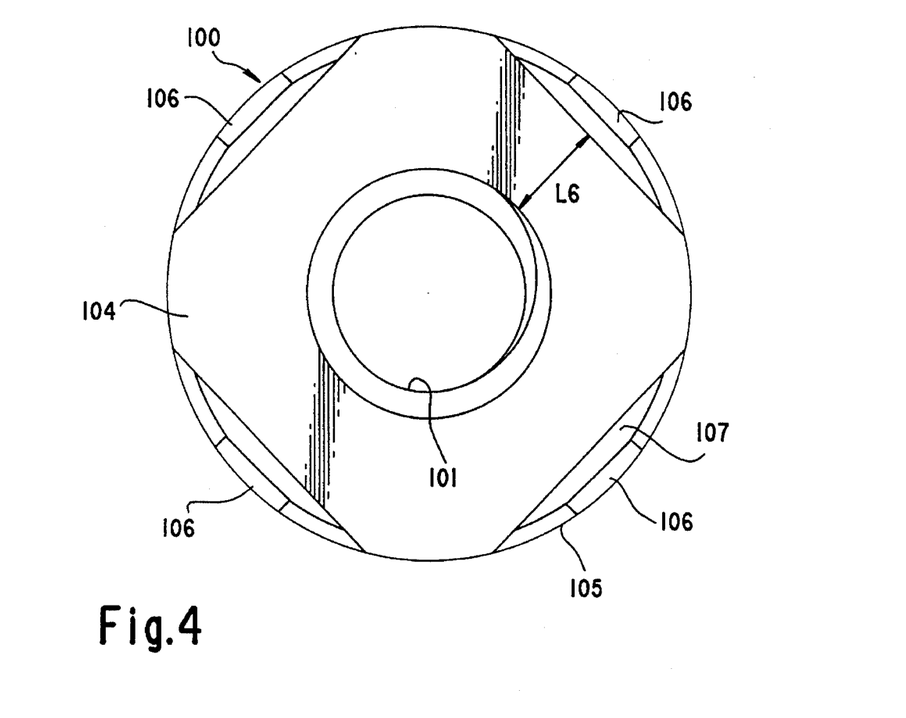
FIG. 4 is a bottom plan view of the first embodiment of the welding nut of this invention.
Figure 5:
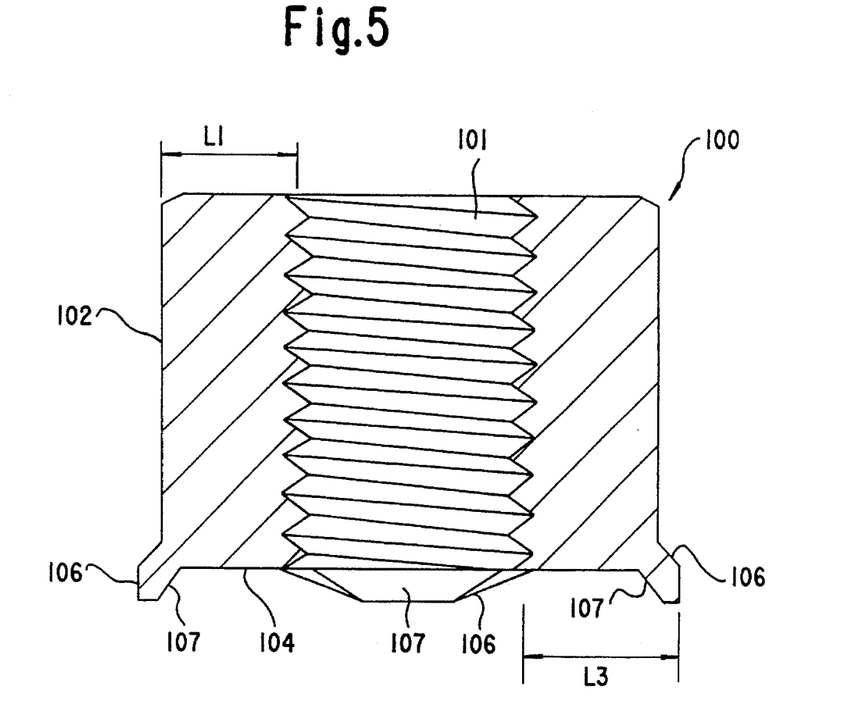
FIG. 5 is a cross section view of the first embodiment of the welding nut of this invention as viewed through lines A—A of FIG. 3.
Figure 6:
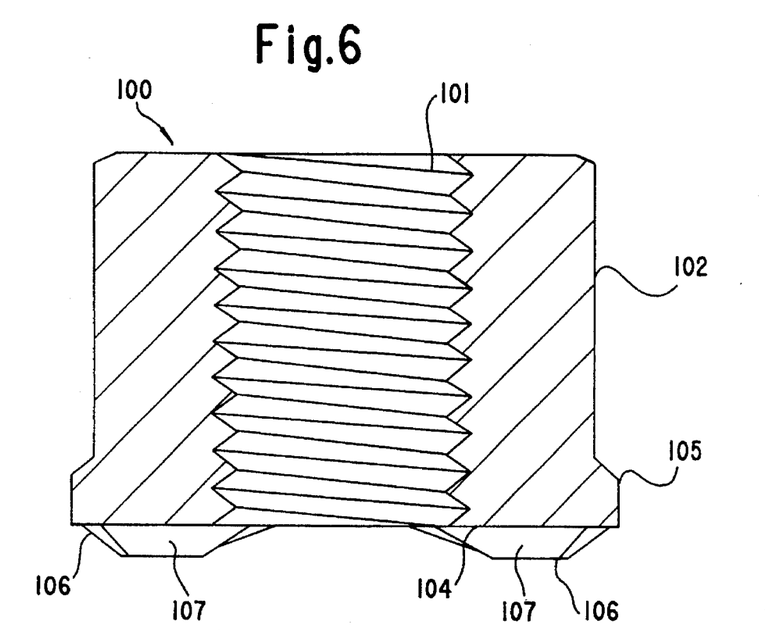
FIG. 6 is a cross section view of the first embodiment of the welding nut of this invention as viewed through lines B—B of FIG. 3.

FIG. 3 is a top plan view of the first embodiment of the nut 100, and FIG. 4 is a bottom plan view of the first embodiment of the nut. In this example, the nut has four equally-spaced protrusions 106. As shown in FIG. 5, the inner surface of a protrusion 106 can be slanted downward towards the outer perimeter of the flange 105 to form a tapered surface 107. This tapering is optional. However, the existence of the tapered surface 107 will enable the protrusion 106 to be positioned at a distance from the screw hole 101, and enable the material of the protrusion 106, when melted, to flow to the exterior.

The structure of the nut 100 as described in this first embodiment is of an extremely simple shape, and can be fabricated completely by a cold forging operation. This should also strengthen the welded and hardened nut.

A nut of a configuration as described, has the following benefits. A nut 100 with a body 102 of a thickness L1, as shown in FIG. 5, equal to thickness L2 of the thinnest wall portion of a conventional angular nut, as shown in FIG. 13, can still have an equivalent nut strength. Accordingly, material for the angular portion of a conventional angular nut is unnecessary, which can significantly reduce material costs.

Moreover, since the protrusions 106 are molded on the flange 105, the distance L3, as shown in FIG. 5, from the end of a protrusion 106 to the screw hole 101 can be set to be equivalent to the distance L4, as shown in FIG. 13, from the end of the protrusion a to the screw hole. This enables the screw threads and protrusions to be separated by a fair distance without hindering the effectiveness of either component.

FIG. 2 shows the state in which a nut 100 of a configuration of the first embodiment is welded to a steel plate 2. In this welding method, the protrusion 106 is abutted against the steel plate 2, and then, using electric resistance welding, a voltage applied between the two surfaces joins them under a strong pressure. This causes a large current to flow, raising the temperature of the surfaces sufficiently to melt and weld the protrusion 106 to the plate 2.

During this process, a weld 3 is formed as the tapered surface 107, set on the protrusion 106, guides the melted material to the exterior. That is, the hot, molten material is diverted from the screw hole 101, reducing the amount of heat transferred to the screw threads themselves.

The protrusions 106 are not formed directly onto the nut 100, but on a flange 105 set around the outer perimeter of the nut 100. Therefore during processing, only a small pressing force is transmitted to the bearing surface 104. Accordingly, its outer edge will not be subject to distortion like a conventional nut. This enables a weld to be formed without any gap between the bearing surface 104 and the steel plate 2, increasing the strength of the weld.

Moreover, since the bearing surface 104 is flat except for the protrusions 106, the flat bearing surface 104 will be cladded to the flat surface of the steel plate 2, in which case, precise orthogonality can be obtained between the screwing axis of the nut 100 and the top surface of the steel plate 2.

Figure 7:
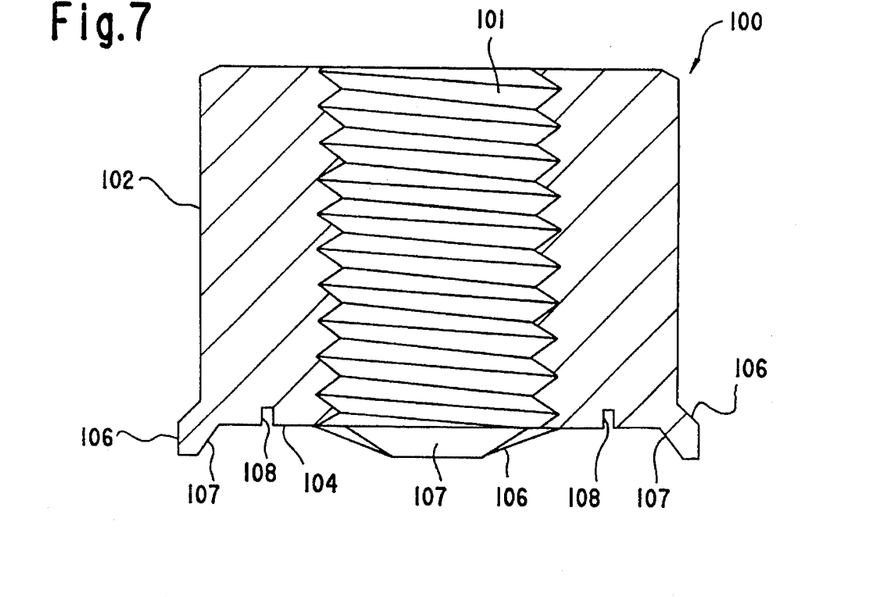
FIG. 7 is an cross section view of a second embodiment of the welding nut of this invention.

FIG. 7 shows a second embodiment of this invention in which a groove 108 is provided in the bearing surface 104 between the protrusion 106 and screw hole 101 of the nut 100 as configured in the first embodiment. The groove 108 can be formed as one continuous groove or as intermittent grooves around the perimeter of the screw hole 101.

During welding, the groove 108 collects molten material of the protrusion 106, preventing it from reaching the screw hole 101. This prevents the screw hole 101 from being damaged or distorted, thus ensuring that the screw threads can be tightened without any loss of force.

Figure 8:
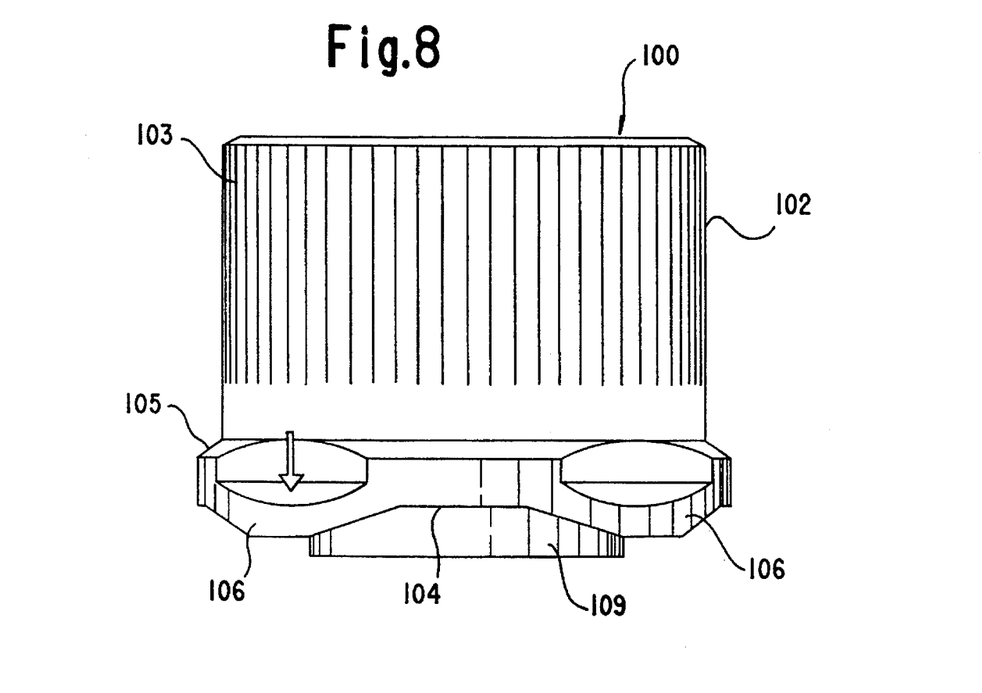
FIG. 8 is a side view of a third embodiment of the welding nut of this invention.
Figure 9:
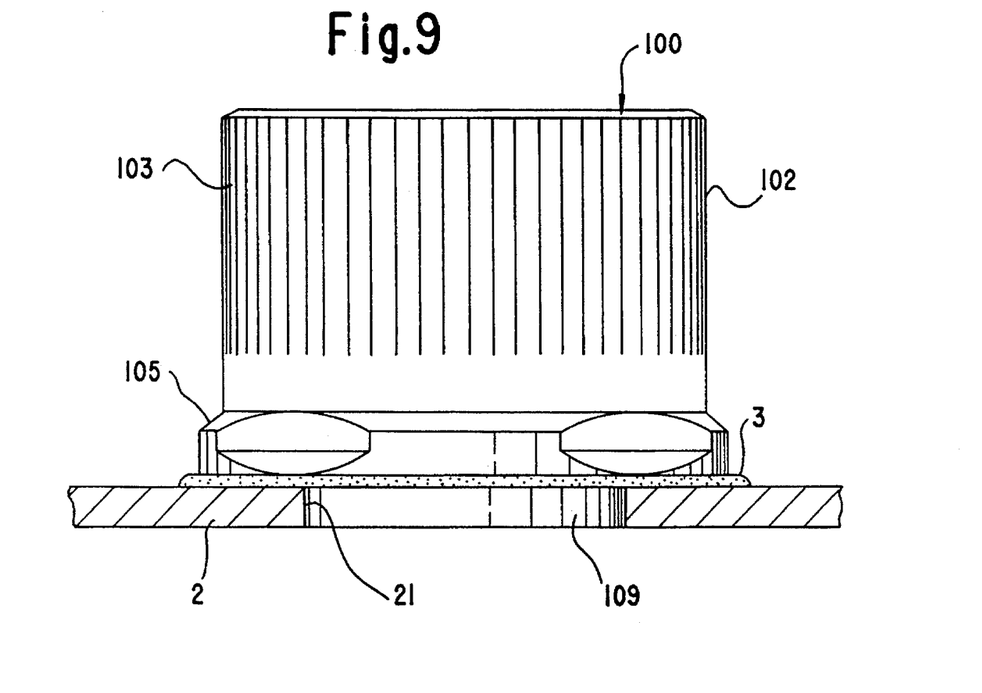
FIG. 9 is a side view of the third embodiment of the welding nut of this invention after being welded to the other weldment component, in this view, a plate.
Figure 10:
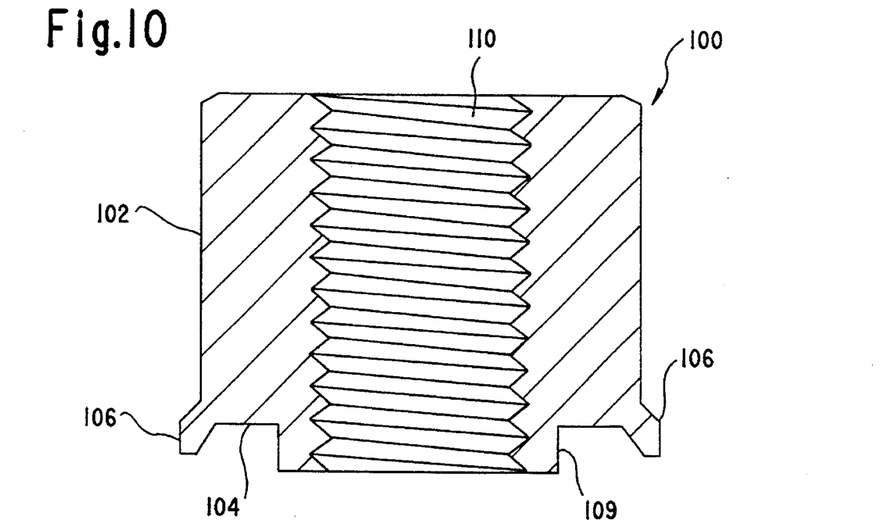
FIG. 10 is a cross section view of the third embodiment of the welding nut of this invention.

FIGS. 8–10 illustrate a third embodiment of this invention in which a guide tube 109, of an external diameter smaller than the external diameter of the nut 100, is extended in the axial direction from the bearing surface 104 of a cylindrical nut 100 as configured in the first embodiment.

FIG. 10 illustrates the case where the screw hole 110 and screw threads are bored continuously through the nut 100 and guide tube 109. However, the inner diameter of the guide tube 109 may be bored larger than the diameter of the screw hole 110, in which case the screw threads are not provided inside the guide tube 109 itself.

It is preferable that the guide tube 109 be of an external diameter such that it can be inserted into a mounting cavity bored in the other weldment component, and that it be longer in axial length to extend beyond the protrusions 106.

During welding, the exterior surface of the guide tube 109 blocks any molten material from the protrusion 106 from scattering and adhering onto the screw threads. This prevents the screw threads from being damaged or distorted, thus ensuring that the screw threads can be tightened without any loss of force.

Generally, in welding a nut, the screw hole of the nut and a mounting cavity bored in the weldment component are aligned. The precise alignment of the center of the two holes is a complex procedure, but imprecise alignment will reduce the strength of the weld. With the nut 100 of the third embodiment of this invention, as shown in FIG. 9, the guide tube 109 is inserted into the mounting cavity 21 of the steel plate or other weldment component. This simple procedure facilitates an accurate alignment of the two holes for a stronger weld.

Figure 11:
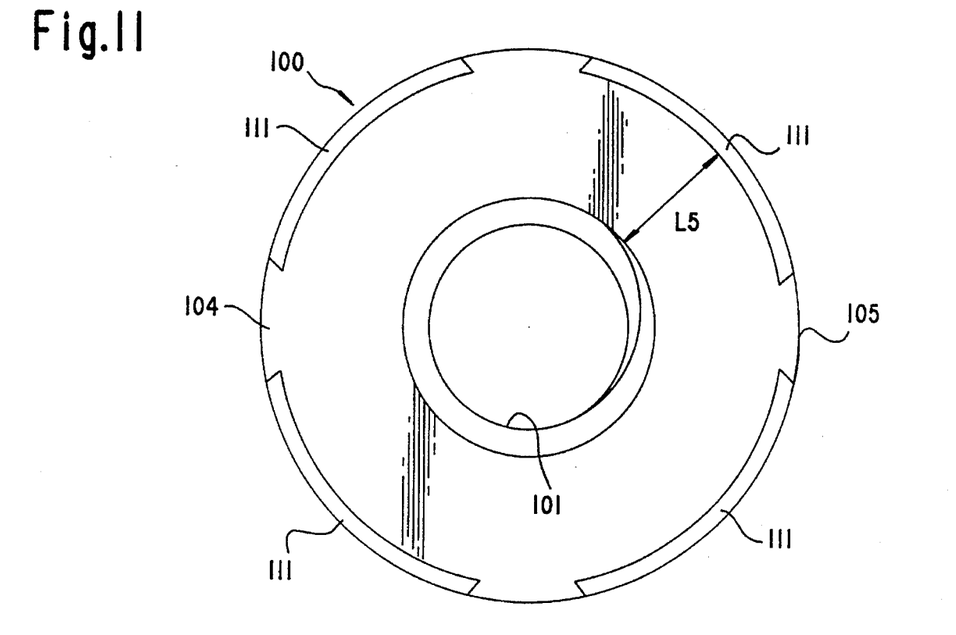
FIG. 11 is a bottom side view of a fourth embodiment of the welding nut of this invention.

FIG. 11 illustrates a fourth embodiment of this invention using a nut 100 of a configuration as described in the first three embodiments, in which protrusions 111 of equal width are set around the outer edge of the flange 105 on its bearing surface side. As in the first embodiment, these protrusions are formed by partially pressing the flange 105 towards the bearing surface 104. This configuration of the fourth embodiment enables a maximum separation L5 between the protrusions 111 and the screw hole 101. That is, this configuration enables the distance between the protrusions 111 and the screw hole 101 to be greater than the distance L6 between the protrusions 106 and the screw hole 101 of the first embodiment as shown in FIG. 4, thus reducing the amount of heat transferred to the screw threads.

Figure 12:
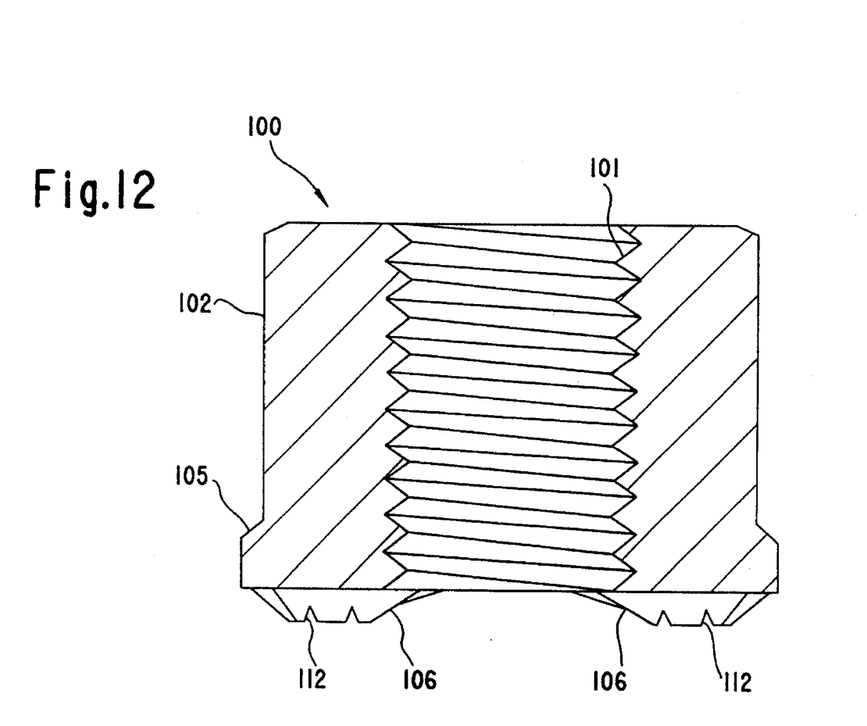
FIG. 12 is a cross section view of a fifth embodiment of the welding nut of this invention.

FIG. 12 illustrates a fifth embodiment of this invention using a nut 100 as configured in the first four embodiments, in which a prescribed number of grooves 112 are formed on the lower end of protrusions 106 or 111. The grooves 112, as described, reduce the contact area between the protrusions 106 or 111 and the other weldment component, which enables the initial melting of the protrusion to proceed more rapidly, thereby reducing the amount of heat created during welding.

It is readily apparent that the above-described welding nut has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

We claim:

1. A welding nut, comprising:
    a cylindrical main body having a bearing surface end and an axial screw hole;
    a flange set around an edge of said bearing surface end; and
    axially extending protrusions for resistance welding formed by pressing parts of said flange in a direction towards said bearing surface end, said protrusions extending beyond the edge of said bearing surface end, wherein a bearing surface of said bearing surface end is a planar surface.

2. A welding nut as claimed in claim 1, wherein at least one groove is formed in said bearing surface between the screw hole and said protrusions.

3. A welding nut as claimed in claim 1, further comprising a guide tube having an external diameter smaller than an external diameter of said cylindrical main body extends axially from said bearing surface.

4. A welding nut as claimed in claim 3, wherein screw threads are bored continuously through said screw hole of said cylindrical main body and an inner perimeter of said guide tube.

5. A welding nut as claimed in any one of claims 1–4, in which a large number of serrated protrusions are formed on an outer perimeter of said cylindrical main body.

6. A welding nut as claimed in any one of claims 1–4, wherein each of said protrusions has an inner surface slanting radially outwardly and axially away from said bearing surface towards an outer edge of said flange.

7. A welding nut as claimed in any one of claims 1–4, wherein said protrusions have equal width and are formed along an outer edge of said flange on a side thereof adjacent said bearing surface.

8. A welding nut as claimed in any one of claims 1–4, wherein at least one groove is formed on a lower end of each of said protrusions.

\* \* \* \* \*